(12) United States Patent
Kai et al.

(10) Patent No.: US 6,777,124 B2
(45) Date of Patent: Aug. 17, 2004

(54) BACK PRESSURE CONTROL APPARATUS FOR FUEL CELL SYSTEM

(75) Inventors: Mitsuru Kai, Utsunomiya (JP); Tomoki Kobayashi, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 302 days.

(21) Appl. No.: 10/117,360

(22) Filed: Apr. 5, 2002

(65) Prior Publication Data

US 2002/0146607 A1 Oct. 10, 2002

(30) Foreign Application Priority Data

Apr. 9, 2001 (JP) .................................... 2001-110362

(51) Int. Cl.[7] .............................................. H01M 8/04
(52) U.S. Cl. .............................. 429/25; 429/34; 429/38; 429/39
(58) Field of Search ........................... 429/25, 34, 38, 429/39

(56) References Cited

U.S. PATENT DOCUMENTS

| | | | |
|---|---|---|---|
| 5,798,186 A | | 8/1998 | Fletcher et al. ............... 429/13 |
| 5,976,725 A | * | 11/1999 | Gamo et al. ................... 429/25 |
| 6,068,941 A | * | 5/2000 | Fuller et al. ................... 429/13 |
| 2004/0028967 A1 | * | 2/2004 | Katsuki et al. ............... 429/22 |

* cited by examiner

Primary Examiner—Patrick Ryan
Assistant Examiner—Angela J. Martin
(74) Attorney, Agent, or Firm—Lahive & Cockfield, LLP; Anthony A. Laurentano

(57) ABSTRACT

A back pressure control apparatus used in a fuel cell system, which can normally operate even when the system starts in a low-temperature environment. The valve has a simple structure realized at low cost. The valve comprises a pipe member which functions as a portion of an oxidizing gas passage and is arranged along an approximately horizontal direction, where a predetermined area of the inner surface of the pipe member is subjected to a hydrophilic process in advance; and a valve element which is provided in the pipe member and is rotatable around a shaft, where the shaft is arranged in a cross-sectional direction of the pipe member. The pipe member may be arranged along an approximately vertical direction. In this case, a predetermined area of the inner surface of the pipe member is subjected to a water repellent process.

4 Claims, 5 Drawing Sheets

BACK PRESSURE CONTROL APPARATUS FOR FUEL CELL SYSTEM

BACKGROUND OF THE INVENTION

1. Field of the Invention

The present invention relates to a back pressure control apparatus for a fuel cell system.

2. Description of the Related Art

A typical example of solid polymer electrolyte fuel cells has a membrane electrode assembly in which an anode and a cathode are provided on either side of a solid polymer electrolyte membrane. Each electrode assembly is placed between a pair of separators so as to support the electrode assembly and form a planar unit cell, and generally, a specific number of the unit cells are stacked in the direction of thickness, so as to obtain a fuel cell stack.

In each unit cell, a fuel gas passage through which a fuel gas (e.g., hydrogen) passes is formed on a surface of an anode separator, that is, one of the separators which faces the anode, and an oxidizing gas passage through which an oxidizing gas (e.g., air including oxygen) passes is formed on a surface of a cathode separator, that is, one of the separators which faces the cathode. In addition, a coolant passage through which a coolant (e.g., cooling water) passes is formed between a separator of a unit cell and a separator of another unit cell which is adjacent to the former unit cell.

Generally, the oxidizing gas is supplied to the oxidizing gas passage by activating a supercharger which is connected to the oxidizing gas passage, and opening a back pressure control valve which is attached to the downstream of the oxidizing gas passage with respect to the fuel cell. That is, the flow rate and the pressure of the oxidizing gas supplied to the fuel cell are controlled according to the rotation speed of the supercharger and the degree of opening of the back pressure control valve.

The back pressure control valve is, for example, a butterfly valve, which is attached to an oxidizing gas passage. This oxidizing gas passage passes through a fuel cell which includes a plurality of unit cells, where the unit cells are stacked in a horizontal direction, and thus the oxidizing gas passage passes through the unit cells in the stacking direction.

When hydrogen, which functions as a fuel gas, is supplied to a reaction plane of the anode, hydrogen is ionized and the hydrogen ions are transferred to the cathode via a solid polymer electrolyte membrane. During this process, electrons are generated and flow to an external circuit, providing DC (direct current) electric energy. Here, air is supplied as an oxidizing gas to the cathode, and the hydrogen ions, electrons, and oxygen in the air react at the cathode, thereby producing water.

Such water (called "produced water" hereinbelow) is produced mainly in an oxidizing gas passage in the fuel cell. When the fuel cell system is stopped and is maintained in a low-temperature environment, the above-explained produced water freezes; thus, it is difficult to restart the fuel cell system. Therefore, while the fuel cell system is stopped, the produced water should be removed through each corresponding passage of the fuel cell system.

If the oxidizing gas passage, which has a relatively small cross-sectional area (through which the fluid passes), receives a great amount of the oxidizing gas supplied from the supercharger, a high flow velocity can be obtained and the produced water can be effectively drained. However, in the vicinity of the back pressure control valve which is attached to the end of the oxidizing gas passage, the cross-sectional area of the passage is relatively large. Therefore, sufficient flow velocity cannot be obtained and a part of the produced water discharged from the fuel cell may remain.

If the produced water remains in the vicinity of the back pressure control valve and the fuel cell system is maintained in a low-temperature environment after the system is stopped, then the remaining water is frozen and lumps of ice are produced. Therefore, when the system is restarted, the lumps of ice contact the valve element of the back pressure control valve, so that the normal operation of the back pressure control valve may be blocked.

SUMMARY OF THE INVENTION

In consideration of the above circumstances, an object of the present invention is to provide a back pressure control apparatus (typically, a back pressure control valve) used in a fuel cell system, which can normally operate even when the system starts in a low-temperature environment.

Therefore, the present invention provides a back pressure control apparatus in a fuel cell system, which is connected to an oxidizing gas passage, wherein the connection position is downstream relative to a fuel cell, the back pressure control apparatus comprising:

- a pipe member which functions as a portion of the oxidizing gas passage and is arranged along an approximately horizontal direction, where a predetermined area of the inner surface of the pipe member is subjected to a hydrophilic process in advance; and
- a valve element which is provided in the pipe member and is rotatable around a shaft, where the shaft is arranged in a cross-sectional direction of the pipe member.

According to the above back pressure control apparatus which is positioned at the downstream relative to the fuel cell and has a pipe member arranged along an approximately horizontal direction, the overall fuel cell system can have a low profile.

When the back pressure control apparatus having the above structure is opened and an oxidizing gas is supplied to the oxidizing gas passage of the fuel cell, water produced in the fuel cell is transferred through the oxidizing gas passage and is drained via the back pressure control apparatus. In this process, the produced water may remain in the vicinity of the back pressure control apparatus due to the horizontally-arranged form of the pipe member. However, the inner surface of the pipe member is subjected to a hydrophilic process in advance; thus, the surface tension of each water drop which contacts the processed inner surface is decreased, so that the contact angle between the surface of the pipe member and the tangential plane of the water drop is small.

Therefore, even if some water drops remain in the vicinity of the back pressure control apparatus due to insufficient draining of the produced water and these water drops freeze, the frozen water drops do not have a height (in the radial direction of the pipe member) which will cause the frozen water drops to contact the valve element, which is provided for closing the pipe member when the operation of the fuel cell is restarted. Therefore, it is possible to prevent the rotation of the valve element from being blocked.

Accordingly, even if the fuel cell is restarted in a low-temperature atmosphere, optimum flow-rate control can be performed. In addition, no external device, such as a heater, for defrosting frozen water drops is necessary; thus, the starting performance of the fuel cell in the low-temperature atmosphere can be improved by employing a simple structure which is low in cost.

The present invention also provides a back pressure control apparatus in a fuel cell system, which is connected to an oxidizing gas passage, wherein the connection position is downstream relative to a fuel cell, the back pressure control apparatus comprising:

a pipe member which functions as a portion of the oxidizing gas passage and is arranged along an approximately vertical direction, where a predetermined area of the inner surface of the pipe member is subjected to a water repellent process in advance; and a valve element which is provided in the pipe member and is rotatable around a shaft, where the shaft is arranged in a cross-sectional direction of the pipe member.

According to this back pressure control apparatus which has a pipe member arranged along an approximately vertical direction, gravity acts downwardly on water drops which remain on the inner surface of the pipe member, In addition, the inner surface of the pipe member is subjected to a water repellent process in advance; thus, the surface tension of each water drop which contacts the processed inner surface is increased, thereby increasing the contact angle. As a result, the contact area between the water drop and the inner surface of the pipe member is decreased, so that the water drop tends to fall along the inner surface of the pipe member due to gravity. Accordingly, it is possible to prevent lumps of ice from being formed in the operational range of the valve element which is rotated when the operation of the fuel cell is restarted.

Therefore, even when the water drops freeze at low temperatures, the frozen water drops do not interfere with the valve element. Accordingly, even if the fuel cell is restarted in a low-temperature atmosphere, optimum flow-rate control can be performed In either type of the back pressure control apparatus, the diameter of the valve element may be less than the inner diameter of the pipe member.

DESCRIPTION OF THE PREFERRED EMBODIMENTS

Hereinafter, the structure of the back pressure control apparatus as the first embodiment according to the present invention will be explained with reference to the drawings.

Figure 1:
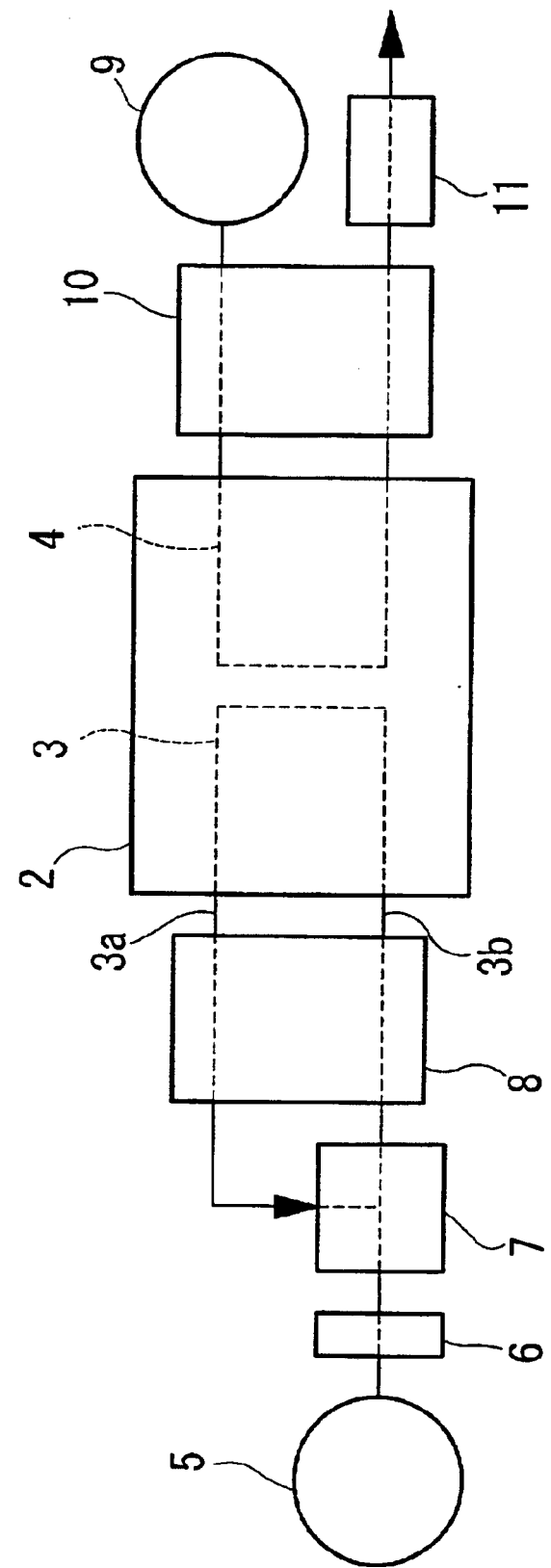
FIG. 1 is a block diagram showing the general structure of a fuel cell system which includes a back pressure control valve as the first embodiment of the present invention.

The back pressure control apparatus of the first embodiment is employed in a fuel cell system 1 shown in FIG. 1. This fuel cell system 1 comprises a fuel cell 2, a fuel gas passage 3 for supplying a fuel gas to the fuel cell 2, and an oxidizing gas passage for supplying an oxidizing gas to the fuel cell 2.

The main elements connected to the fuel gas passage 3 are a fuel gas source 5 (i.e., high-pressure tank) for supplying a pressurized fuel gas, a shutoff valve 6 for switching the operation between the supply and the cutoff of the fuel gas from the fuel gas source 5 to the fuel gas passage 3, an ejector 7 for circulating the fuel gas via the loop-shaped fuel gas passage 3, and a humidifier 8 for humidifying the fuel gas, which passes through an inlet-side passage 3b (i.e., connected to the inlet of the fuel cell 2), by using the fuel gas which passes through an outlet-side passage 3a (i.e., connected to the outlet of the fuel cell 2).

When the shutoff valve 6 is opened and the fuel gas supplied from the fuel gas source 5 is supplied to the fuel gas passage 3, the supplied gas is suitably humidified by the humidifier 8 and is then supplied to the fuel cell 2. After the power generation of the fuel cell 2 is started, the fuel gas is consumed and the remaining fuel gas (which has not been used) is discharged from the fuel cell 2. The discharged fuel gas is again supplied to the humidifier 8 and moisture in the fuel gas is provided to the fuel gas supplied from the ejector 7. The discharged fuel gas is merged with a newly-supplied fuel gas by the ejector 7, and the merged fuel gas is supplied to the fuel cell 2.

On the other hand, the main elements connected to the oxidizing gas passage 4 are a supercharger 9 into which an oxidizing gas is drawn and from which the oxidizing gas is supplied, a humidifier 10, and a back pressure control valve 11 which functions as the back pressure control apparatus. The back pressure control valve 11 is positioned in the vicinity of the outlet of the oxidizing gas passage 4. That is, the oxidizing gas which is drawn into the oxidizing gas passage 4 by the supercharger 9 is supplied to the humidifier 10 and is humidified, and the humidified oxidizing gas is then supplied to the fuel cell 2. The remaining oxidizing gas, which has not been consumed for power generation in the fuel cell 2, is discharged from the fuel cell and is again supplied to the humidifier 10, where moisture of the discharged oxidizing gas is provided to an oxidizing gas which is newly supplied from the supercharger 9. The discharged oxidizing gas then passes through the back pressure control valve 11 and is discharged to the atmosphere. In the above process, the rotation speed of the supercharger 9 and the degree of opening of the back pressure control valve 11 are controlled, thereby controlling the flow rate and the pressure of the oxidizing gas which passes through the oxidizing gas passage 4.

Figure 2:
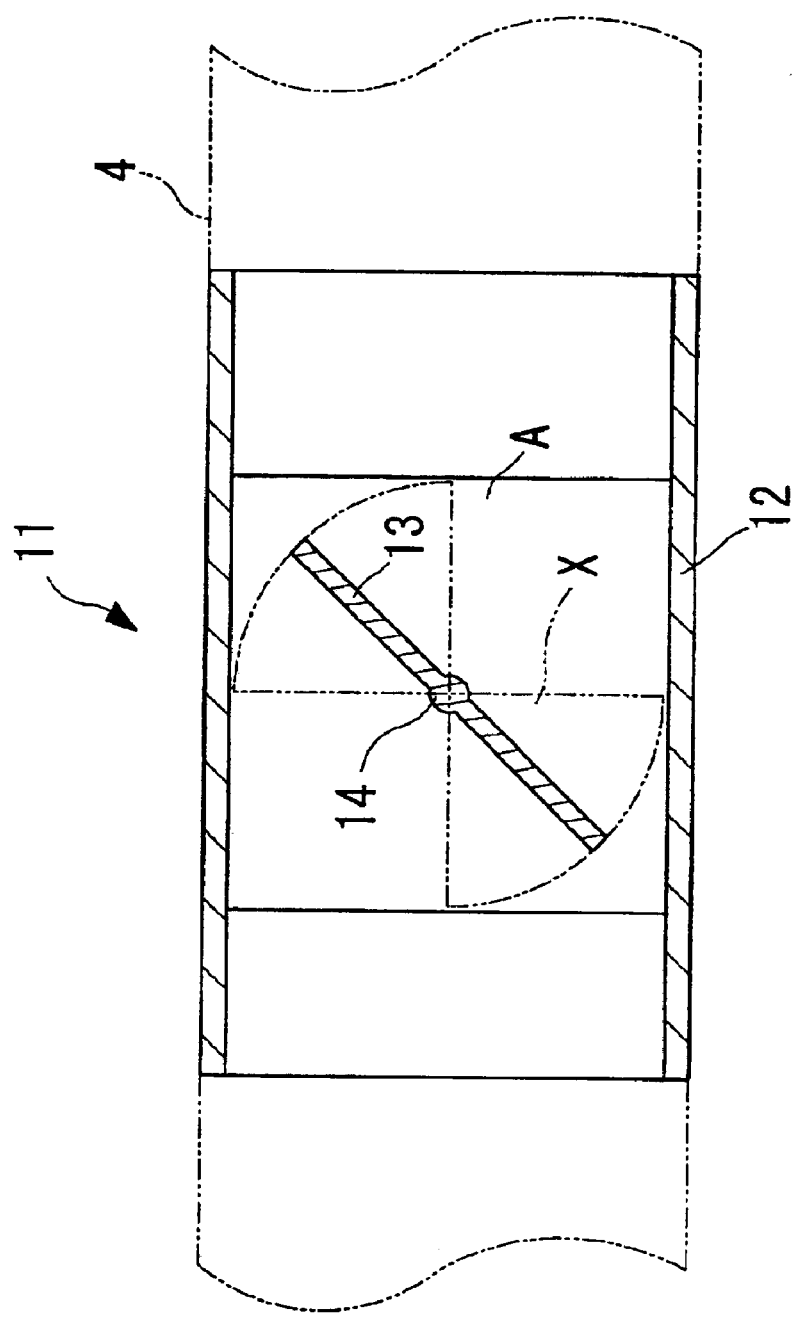
FIG. 2 is a longitudinal sectional view showing the back pressure control valve in FIG. 1.

As shown in FIG. 2, the back pressure control valve in the present embodiment is a butterfly valve which includes a pipe member 12 which functions as a constituent of the oxidizing gas passage 4 and a valve element 13 which is provided inside the pipe member 12. The pipe member 12 functions as an extension of the oxidizing gas passage 4 which is connected to the outlet of the fuel cell 2 in a substantially horizontal direction, that is, the pipe member 12 is also arranged in the substantially horizontal direction.

The valve element 13 is substantially disk shape, that is, the disk shape is substantially equal to the cross-sectional shape of the passage of the pipe member 12. In addition, the valve element 13 is rotatable around a shaft 14 which is horizontally provided along a radial direction of the pipe member 12 (see FIG. 2).

The necessary range of the rotation angle of the valve element 13 is substantially 90 degrees between the vertical position in which the valve element 13 is vertically positioned so as to close the passage of the pipe member 12 and the horizontal position in which the passage of the pipe member is fully opened.

A portion of the inner surface of the pipe member 12 of the back pressure control valve 11 is subjected to a hydrophilic process in advance. In FIG. 2, reference symbol A indicates an area which is subjected to the hydrophilic process. This hydrophilic process is performed, for example, by coating the target area of the inner surface of the pipe member with titanium oxide. The specific hydrophilic process is not limited to the above, and any suitable method can be employed.

That is, in the pipe member 12 which can be closed by the valve element 13, a predetermined area at each side in the longitudinal direction of the pipe member (i.e., each of the upstream and downstream sides) is subjected to the hydrophilic process. The predetermined area can be freely defined. For example, the area can have a width similar to the radius of the valve element 13.

The function of the back pressure control valve 11 having the above-explained structure will be explained below.

During power generation by the fuel cell 2, the degree of opening of the back pressure control valve 11 is controlled by a controller (not shown), so that the flow rate and the pressure of the oxidizing gas which passes through the oxidizing gas passage 4 are controlled.

When the power generation of the fuel cell 2 is stopped, the back pressure control valve 11 is fully opened and has a substantially horizontal position, so that a large amount of the oxidizing gas passes through the oxidizing gas passage 4. Accordingly, water produced in the fuel cell 2 is drained. In this process, most of the drained water passes through the back pressure control valve 11 and is discharged outside. However, the remaining water remains as water drops in the vicinity of the back pressure control valve 11.

Preferably, after the above process of draining of water, the fully open position, that is, the substantially horizontal position of the back pressure control valve 11 is maintained. Under this condition, when the back pressure control valve 11 is exposed to a low-temperature atmosphere while the fuel cell 2 is stopped, the valve element 13 can have a position by which the valve element 13 does not contact water drops W. Therefore, the valve element 13 does not obstruct the draining of water, and it is possible to prevent the valve element 13 from sticking to the pipe member 12. If the valve element 13 sticks to the pipe member 12, the back pressure control valve 11 cannot operate normally when the operation of the fuel cell restarts.

Figure 3:
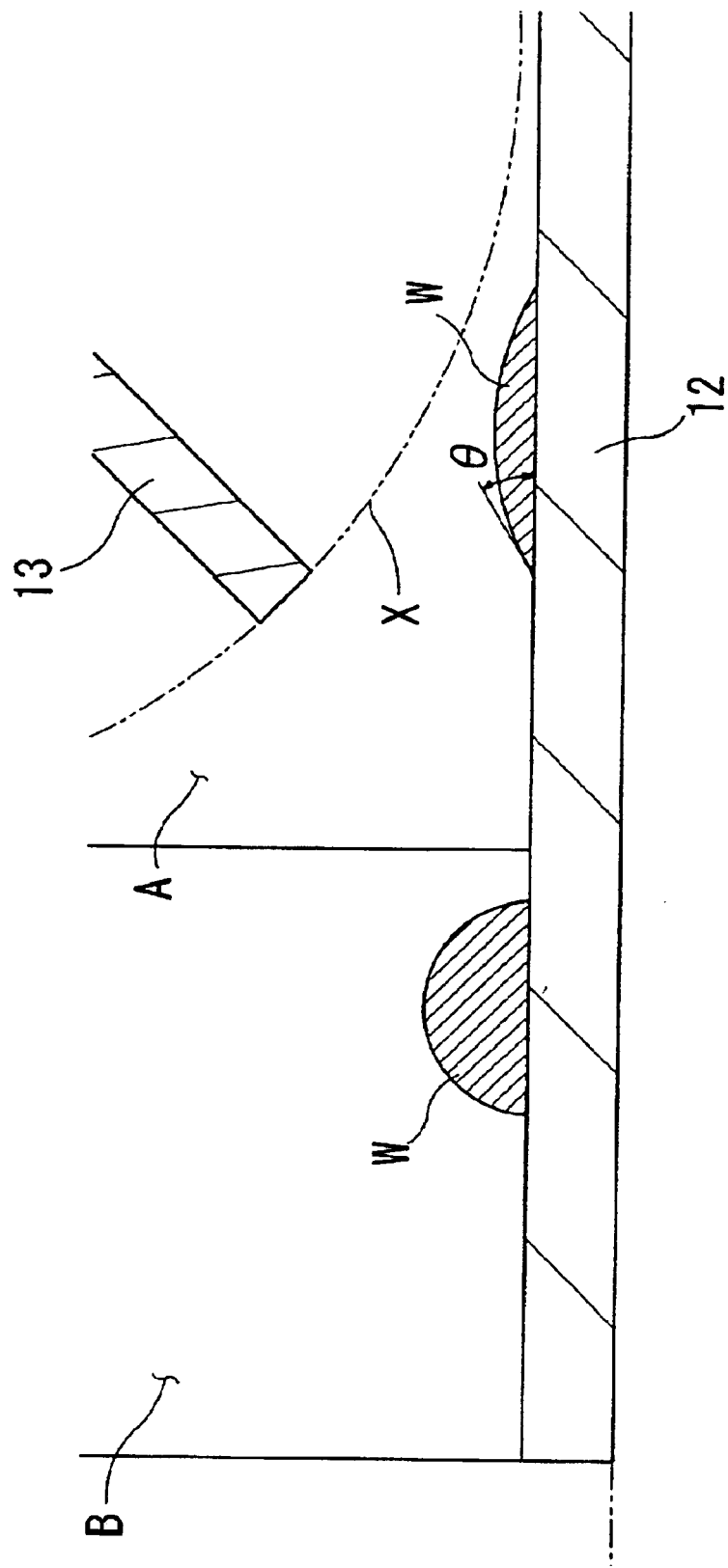
FIG. 3 is a longitudinal sectional view showing a state in which water drops adhere in the vicinity of the valve element of the back pressure control valve in FIG. 1.

In the back pressure control valve 11 of the present embodiment, the inner surface of the pipe member 12 is subjected to the hydrophilic process in advance. Therefore, a water drop W which is formed on the area A (which has been subjected to the hydrophilic process) of the inner surface of the pipe member 12 has a relatively flat shape as shown in FIG. 3.

That is, in comparison with another water drop W which is formed in area B of the inner surface of the pipe member 12, which has not been subjected to the hydrophilic process, the height of water drop W in area A is less because this water drop W has a lower surface tension due to the hydrophilic process and thus the contact angle θ between the surface of the pipe member 12 and the tangential plane of the water drop W is smaller.

If the fuel cell system 1 is maintained in a low-temperature environment after the power generation of the fuel cell 2 is stopped, water which remains in the vicinity of the back pressure control valve 11 freezes. However, according to the back pressure control valve 11 of the present embodiment, each water drop W adhered to the relevant inner surface of the pipe member 12 has a lower shape. Therefore, even if such lower water drop W freezes, the frozen water drop is not a protrusion which interferes with the operational range X of the valve element 13. Therefore, the operation of the fuel cell 2 can be normally restarted.

If it is unnecessary to completely close the oxidizing gas passage 4 by using the back pressure control valve 11, the diameter of the valve element 13 can be defined to be less than the inner diameter of the oxidizing gas passage 4, so as to produce a gap between the valve element 13 and the pipe member 12 when the valve is set to a fully-closed position. In this case, the interference between the frozen water drops and the valve element 13 can be much more reliably avoided.

Figure 4:
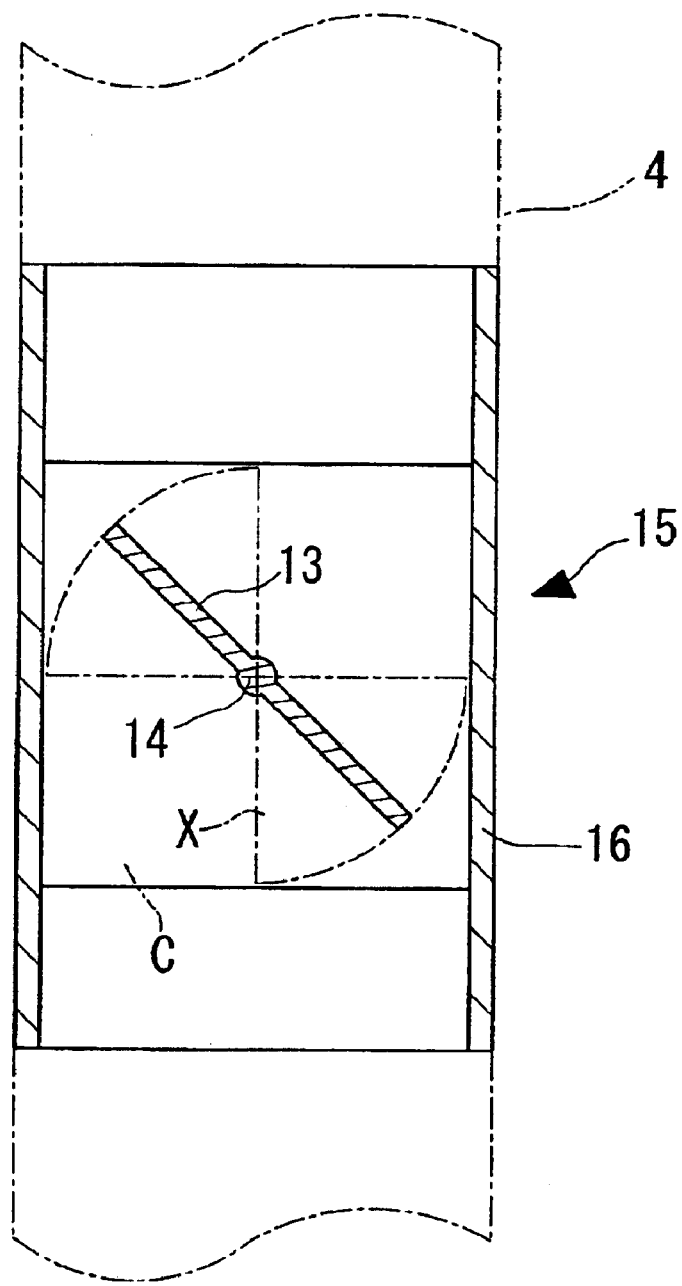
FIG. 4 is a longitudinal sectional view showing a back pressure control valve for a fuel cell system, as the second embodiment of the present invention.
Figure 5:
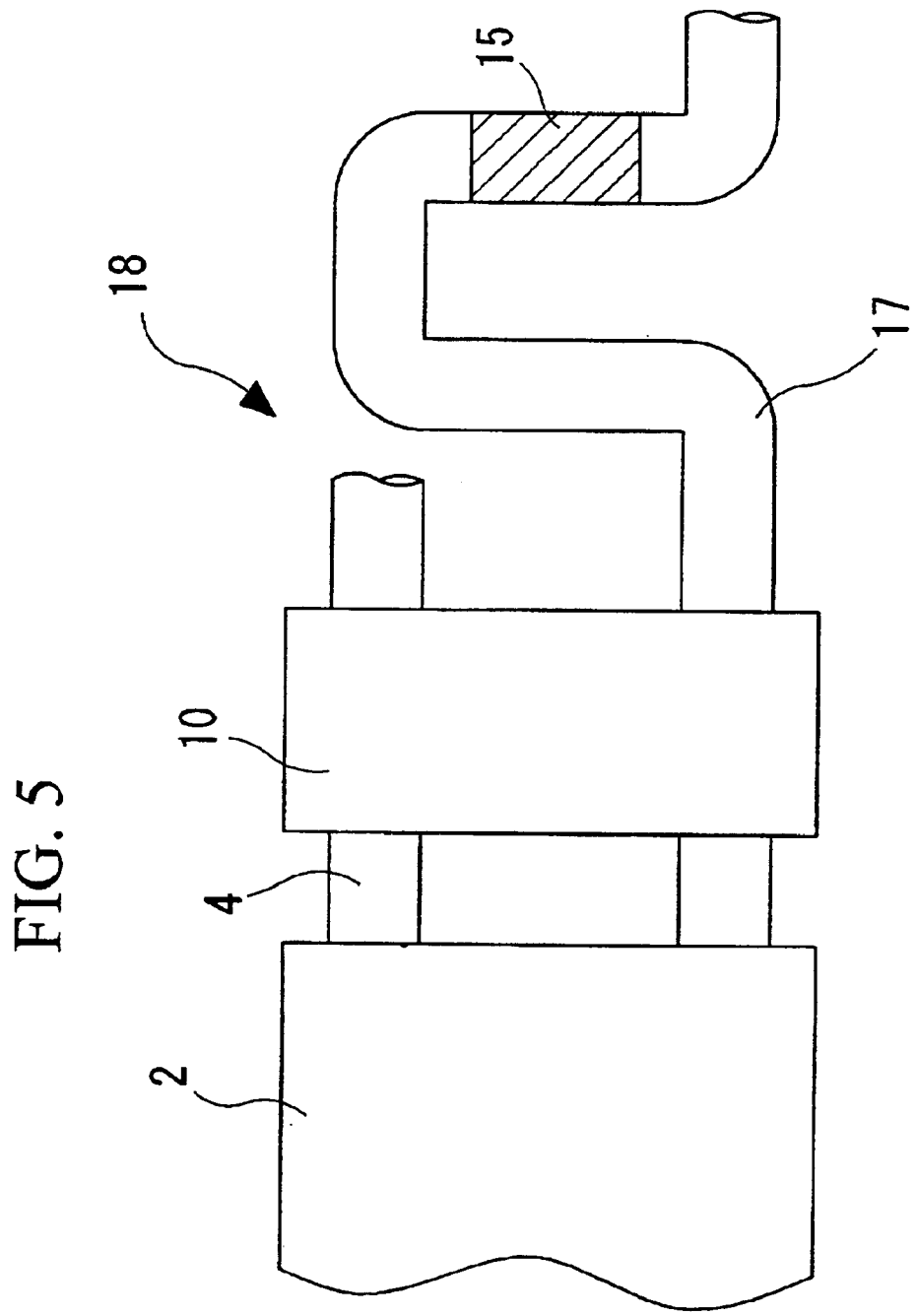
FIG. 5 is a diagram showing the general structure of the oxidizing gas passage of the fuel cell system, which has the back pressure control valve in FIG. 4.

Below, the second embodiment of the back pressure control apparatus according to the present invention will be explained with reference to FIGS. 4 and 5.

In comparison with the back pressure control valve 11 of the first embodiment, the back pressure control valve 15 of the second embodiment has distinctive features (see FIGS. 4 and 5) of (i) having a pipe member 16 which is vertically arranged, and (ii) the inner surface of the pipe member 16 is subjected to a water repellent process in advance.

The water repellent process is performed, for example, by coating a predetermined area C of the inner surface of the pipe member 16 with a fluorine or silicone resin. If the pipe member 16 is made of an aluminium material, Alumite treatment may be performed in the water repellent process. Another suitable method can be employed for the water repellent process. Similar to the predetermined area A of the first embodiment, the area C can be suitably defined.

The back pressure control valve 15 having the above structure is attached to a piping 17 which is connected to the outlet of the fuel cell 2 and has a bent U-shape (see FIG. 5), where the height of the bent-U portion is equal to or less than the height of the fuel cell 2. Therefore, even though the back pressure control valve 15 is vertically positioned, the height of the overall fuel cell system 18 is not increased. Here, the bent U-shape piping is not always necessary depending on the system layout.

According to the back pressure control valve 15 having the above-explained structure, when the back pressure control valve 15 is released so as to discharge produced water from the fuel cell 2, even if some of the water remains in the oxidizing gas passage 4 and adheres in the vicinity of the back pressure control valve 15, gravity vertically acts on each water drop W along the inner surface of the pipe member 16 because the pipe member 16 of the back pressure control valve 15 is substantially vertically arranged.

In addition, the inner surface of the pipe member 16 is subjected to the water repellent process in advance; thus, the surface tension of each water drop W which contacts the processed inner surface is increased, thereby increasing the contact angle up to an obtuse angle. As a result, the contact area between the water drop W and the inner surface of the pipe member 16 is decreased, so that the adhesion of the water drop W to the inner surface of the pipe member 16 is decreased.

As explained above, gravity acts downwardly on each water drop W; thus, the water drop W falls in the vertical and downward direction along the inner surface of the pipe member 16, so that the water drop W is removed from the vicinity of the valve element 13.

That is, even if produced water remains in the oxidizing gas passage 4, the remaining water does not contact the valve element 13. Therefore, even when the system is maintained in a low-temperature atmosphere, lumps of ice formed in the oxidizing gas passage 4 do not interfere with the operational range X of the valve element 13. Accordingly, the valve element 13 can operate normally when the operation of the fuel cell 2 is restarted.

In addition, after the water draining operation, the back pressure control valve 15 can be fully opened, that is, the valve element 13 is maintained in a substantially vertical position. Accordingly, even if the back pressure control valve 15 is exposed to a low-temperature atmosphere while the fuel cell 2 is stopped, the valve element 13 can be maintained without contacting the water drop W. Therefore, the valve element 13 does not obstruct the draining of water, and it is possible to prevent the valve element 13 from sticking to the pipe member 16. Accordingly, the normal operation of the back pressure control valve 15 is not obstructed when the operation of the fuel cell is restarted.

In the above-explained embodiments, the pipe members 12 and 16 are respectively horizontally and vertically arranged. However, the direction of the arrangement of the pipe member is not strictly limited as above, and the pipe members 12 and 16 may be inclined within a permissible range, that is, the pipe members 12 and 16 can be approximately horizontally and vertically arranged, so as to obtain similar effects.

What is claimed is:

1. A back pressure control apparatus in a fuel cell system, which is connected to an oxidizing gas passage, wherein a connection position is downstream relative to a fuel cell, the back pressure control apparatus comprising:

a pipe member which functions as a portion of the oxidizing gas passage and is arranged along a substantially horizontal direction, where a predetermined area of the inner surface of the pipe member is subjected to a hydrophilic process in advance; and a valve element which is provided in the pipe member and is rotatable around a shaft, where the shaft is arranged in a cross-sectional direction of the pipe member.

2. A back pressure control apparatus as claimed in claim 1, wherein the diameter of the valve element is less than the inner diameter of the pipe member.

3. A back pressure control apparatus in a fuel cell system, which is connected to an oxidizing gas passage, wherein a connection position is downstream relative to a fuel cell, the back pressure control apparatus comprising:

a pipe member which functions as a portion of the oxidizing gas passage and is arranged along a substantially vertical direction, where a predetermined area of the inner surface of the pipe member is subjected to a water repellent process in advance; and a valve element which is provided in the pipe member and is rotatable around a shaft, where the shaft is arranged in a cross-sectional direction of the pipe member.

4. A back pressure control apparatus as claimed in claim 3, wherein the diameter of the valve element is less than the inner diameter of the pipe member.

* * * * *